(12) United States Patent
Shang et al.

(10) Patent No.: US 12,442,700 B2
(45) Date of Patent: Oct. 14, 2025

(54) MULTI-WAVELENGTH LASER FOR SYNCHRONOUSLY MONITORING TEMPERATURE AND PRESSURE OF OCEAN

(71) Applicant: LASER INSTITUTE OF SHANDONG ACADEMY OF SCIENCE, Shandong (CN)

(72) Inventors: Ying Shang, Jinan (CN); Jiasheng Ni, Jinan (CN); Chen Wang, Jinan (CN); Qian Guo, Jinan (CN); Zhiqiang Song, Jinan (CN); Wenan Zhao, Jinan (CN); Sheng Huang, Jinan (CN); Chang Li, Jinan (CN); Bing Cao, Jinan (CN); Lei Lv, Jinan (CN)

(73) Assignee: Laser Institute Of Shandong Academy Of Science, Shandong (CN)

( * ) Notice: Subject to any disclaimer, the term of this patent is extended or adjusted under 35 U.S.C. 154(b) by 385 days.

(21) Appl. No.: 18/019,451

(22) PCT Filed: Jul. 6, 2020

(86) PCT No.: PCT/CN2020/100403
§ 371 (c)(1),
(2) Date: Feb. 2, 2023

(87) PCT Pub. No.: WO2022/006701
PCT Pub. Date: Jan. 13, 2022

(65) Prior Publication Data
US 2023/0288272 A1    Sep. 14, 2023

(51) Int. Cl.
*G01L 1/24* (2006.01)
*G01K 11/3206* (2021.01)

(52) U.S. Cl.
CPC .......... *G01L 1/246* (2013.01); *G01K 11/3206* (2013.01)

(58) Field of Classification Search
CPC .......................... G01L 1/246; G01K 11/3206
See application file for complete search history.

(56) References Cited

U.S. PATENT DOCUMENTS

| 6,542,228 B1 | 4/2003 | Hartog | |
| 10,008,819 B2 * | 6/2018 | Leonardo | .............. H01S 3/0092 |

(Continued)

FOREIGN PATENT DOCUMENTS

| CN | 102445326 A | * | 5/2012 |
| CN | 103115636 A | * | 5/2013 |

(Continued)

OTHER PUBLICATIONS

International Search Report (English and Chinese) and Written Opinion of the International Searching Authority (English and Chinese) issued in PCT/CN2020/100403, mailed Mar. 26, 2021; ISA/CN.

*Primary Examiner* — Octavia Hollington
(74) *Attorney, Agent, or Firm* — Harness, Dickey & Pierce, P.L.C.

(57) ABSTRACT

The present application provides a multi-wavelength laser for synchronously monitoring the temperature and pressure of an ocean. A pulse controller is used to convert a broadband laser outputted by a broadband laser source into a broadband pulsed light, and then a phase shifted fiber bragg grating unit is used to demodulate a plurality of pulsed light with different wavelengths from the broadband pulsed light. The pulsed light outputted by the laser is emitted into a sensing fiber in seawater via a wavelength division multiplexer, scattered light is returned to a control demodulation module via the wavelength division multiplexer, the control demodulation module demodulates the scattered light, so that the dynamic pressure is parsed according to a phase (Continued)

change of a light signal, and the seawater temperature is parsed according to a wavelength change of the light signal.

6 Claims, 3 Drawing Sheets

(56) References Cited

U.S. PATENT DOCUMENTS

| | | | |
|---|---|---|---|
| 2003/0133657 A1 | 7/2003 | Kochergin et al. | |
| 2023/0304832 A1* | 9/2023 | Wang | .................... G01L 11/025 |

FOREIGN PATENT DOCUMENTS

| | | | | | |
|---|---|---|---|---|---|
| CN | 103954308 A | | 7/2014 | | |
| CN | 107796313 A | | 3/2018 | | |
| CN | 107796314 A | | 3/2018 | | |
| CN | 106482863 B | * | 2/2019 | ......... | G01K 11/3206 |
| JP | 2004037948 A | * | 2/2004 | | |
| JP | 2004037949 A | * | 2/2004 | | |
| JP | 2004198682 A | * | 7/2004 | | |

* cited by examiner

MULTI-WAVELENGTH LASER FOR SYNCHRONOUSLY MONITORING TEMPERATURE AND PRESSURE OF OCEAN

CROSS REFERENCE TO RELATED APPLICATIONS

This application is a U.S. National Phase Application under 35 U.S.C. 371 of International Application No. PCT/CN2020/100403, filed on Jul. 6, 2020. The entire disclosure of the above application is expressly incorporated by reference herein.

FIELD OF THE PRESENT DISCLOSURE

The present application relates to the technical field of ocean environment monitoring, and particularly relates to a multi-wavelength laser for synchronously monitoring temperature and pressure of an ocean.

BACKGROUND OF THE PRESENT DISCLOSURE

Ocean is vast in area and changes rapidly, and it is an important factor influencing natural disasters such as global climate changing, flood, drought and typhoon, and therefore ocean environment is of great significance to weather forecast and disaster early warning. The measurement on seawater temperature and pressure is of great significance to the research of oceanography, ocean environment monitoring, etc. For example, in the fields of ocean scientific investigation and military affairs it is necessary to obtain dynamic changes of the ocean temperature profile and pressure in time.

At present, most of ocean temperature and pressure monitoring devices are electrical devices, most of which have the problems such as high price, large size, difficult arrangement and susceptible to electromagnetic interference. In addition, the temperature and pressure are respectively subjected to monitoring and signal processing by discrete electronic devices. A large number of sensor combination arrays are needed to realize large-range monitoring of the sea area. Therefore, there are problems of huge investment, complex system, low reliability, difficult data compatibility and comprehensive processing, etc.

In view of this, in order to adapt to the development requirement of ocean planning, it is needed to vigorously develop ocean temperature and pressure monitoring devices which have strong data compatibility, low cost and compact structure and meet the requirement of high-precision in-situ measurement. The distributed fiber sensing technology can realize continuous sensing and measurement of measured physical quantities distributed along the length direction of an optical fiber, and may integrate sensing and transmission functions, so that continuous measurement of spatial and temporal multi-dimensional distribution state information of distributed environmental parameters on the whole optical fiber length can be realized, and distributed measurement information can be transmitted to an information processing center in real time in a lossless way. Meanwhile, a sensing system based on the distributed fiber sensing technology has the advantages of simple structure, convenience in use, low signal acquisition cost in unit length, high cost performance, etc. Therefore, the technology is applied to continuous space monitoring of the ocean temperature and pressure.

In a distributed fiber sensing system, a multi-wavelength laser source is a key device. The existing multi-wavelength laser source is high in price, which seriously influences large-scale popularization of the distributed fiber sensing system. It is urgently needed to develop a multi-wavelength laser source with low price and high performance by those skilled in the art at present.

SUMMARY OF THE PRESENT DISCLOSURE

In order to solve above problems, an embodiment of the present application provides a multi-wavelength laser for synchronously monitoring temperature and pressure of an ocean.

In a first embodiment of the present application, the multi-wavelength laser for synchronously monitoring temperature and pressure of the ocean includes:
  a broadband laser source configured to output broadband laser;
  a pulse controller configured to convert the broadband laser output by the broadband laser source into broadband pulsed light;
  a phase shifted fiber bragg grating unit configured to demodulate a plurality of pulsed light arranged by a time sequence and having different wavelengths from the broadband pulsed light.

In a second embodiment, the laser further includes a first wavelength division multiplexer,
  wherein a first port of the first wavelength division multiplexer is connected to an output end of the pulse controller, a second port of the second wavelength division multiplexer is connected to the phase shifted fiber bragg grating unit, and a third port is configured to output the plurality of pulsed light arranged by a time sequence and having different wavelengths;
  the phase shifted fiber bragg grating unit includes an optical fiber, and a plurality of reflective phase shifted fiber bragg gratings having different central window wavelengths are arranged on the optical fiber.

In a third embodiment, the laser further includes the first wavelength division multiplexer,
  wherein the first port of the first wavelength division multiplexer is connected to the output end of the pulse controller, the second port of the second wavelength division multiplexer is connected to the phase shifted fiber bragg grating unit, and the third port is configured to output the plurality of pulsed light arranged by a time sequence and having different wavelengths;
  the phase shifted fiber bragg grating unit includes a plurality of optical fibers; a reflective phase shifted fiber bragg grating is arranged on each optical fiber; and the central window wavelengths of the phase shifted fiber bragg gratings on all the optical fibers are different.

In a fourth embodiment, the laser further includes the first wavelength division multiplexer; the phase shifted fiber bragg grating unit includes a plurality of optical fibers; a transmissive phase shifted fiber bragg grating is arranged on each optical fiber; and the central window wavelengths of the phase shifted fiber bragg gratings on all the optical fibers are different;
  the first port of the first wavelength division multiplexer is connected to the output end of the pulse controller, and the second port of the first wavelength division multiplexer is connected to one end of each optical fiber.

In a fifth embodiment, the laser further includes a signal amplifier, wherein the signal amplifier is configured to amplify an amplitude of the plurality of pulsed light having different wavelengths and then output the pulsed light.

In a sixth embodiment, the signal amplifier is an erbium-doped fiber amplifier or a ytterbium-doped fiber amplifier.

In a seventh embodiment, the pulse controller is an electro-optical modulator and/or an acoustic optical modulator.

According to the multi-wavelength laser for synchronously monitoring temperature and pressure of the ocean provided by the embodiments, as shown in the abovementioned embodiments, the pulse controller is used to convert the broadband laser outputted by the broadband laser source into the broadband pulsed light, and then the phase shifted fiber bragg grating unit is used to demodulate a plurality of pulsed light with different wavelengths from the broadband pulsed light. The pulsed light outputted by the laser is emitted into the sensing fiber in seawater by means of the wavelength division multiplexer, scattered light is returned to the control demodulation module by means of the wavelength division multiplexer, the control demodulation module demodulates the scattered light, so that the dynamic pressure is parsed according to the phase change of the light signal, and the seawater temperature is parsed according to a wavelength change of the light signal, thereby achieving simultaneous monitoring of the dynamic pressure and the seawater temperature. In the laser provided by the present embodiment, a low-cost common broadband laser is selected as the broadband laser source. Furthermore, a phase shifted fiber bragg grating is used to demodulate a broadband laser, and as the bandwidth of the laser is extremely narrow, a high-quality pulse laser spectrum can be obtained.

BRIEF DESCRIPTION OF THE DRAWINGS

In order to more clearly explain the technical solution of the present application, the following will briefly introduce the accompanying drawings needed in the embodiments. It is obvious that for ordinary technicians in the art, other drawings can also be obtained from these drawings without paying creative labor.

DESCRIPTION OF THE EMBODIMENTS

Exemplary embodiments will be described in detail herein, and examples thereof are shown in the accompanying drawings. When the following description relates to the accompanying drawings, unless otherwise indicated, the same numbers in different accompanying drawings represent the same or similar elements. The embodiments described in the following exemplary embodiments do not represent all embodiments consistent with the present application. On the contrary, they are only examples of devices and methods consistent with some aspects of the present application as detailed in the attached claims.

A multi-wavelength laser provided by the embodiment includes a broadband laser source, a pulse controller and a phase shifted fiber bragg grating unit, wherein the pulse controller is configured to convert broadband laser output by the broadband laser source into broadband pulsed light; and the phase shifted fiber bragg grating unit performs demodulation on a plurality of pulsed light having different wavelengths from the broadband pulsed light.

A Phase Shifted Fiber Bragg Grating (PSFBG) in the phase shifted fiber bragg grating unit can realize reflection or transmission of the laser, and the bandwidths of a transmission spectrum and a reflection spectrum are extremely narrow. In the embodiment, a bragg grating optical fiber is divided into a transmissive phase shifted fiber bragg grating and a reflective phase shifted fiber bragg grating according to the demodulating mode of the phase shifted fiber bragg grating to the laser. Based on the type of the phase shifted fiber bragg grating, the broadband laser source in the multi-wavelength laser, the pulse controller and the phase shifted fiber bragg grating unit may have three different structural forms.

Figure 1:
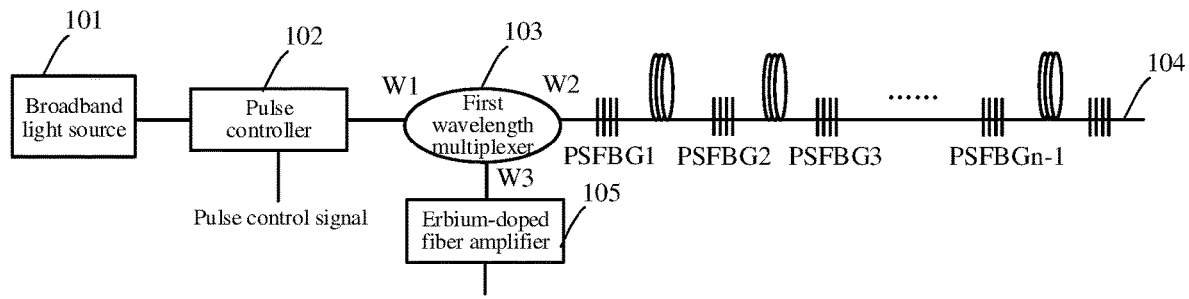
FIG. 1 is a basic structure schematic diagram of a first multi-wavelength laser provided by an embodiment of the present application.

FIG. 1 is the basic structure schematic diagram of the first multi-wavelength laser provided by the embodiment of the present application. As shown in the FIG. 1, the multi-wavelength laser includes a broadband laser source 101, a pulse controller 102, a first wavelength division multiplexer 103 and a phase shifted fiber bragg grating unit 104.

An output end of the broadband laser source 101 is connected to an input end of the pulse controller 102 for outputting broadband laser having small coherence length to the pulse controller 102, for example, laser having the line width of hundreds of MHz or above. The pulse controller 102 can be an electro-optical modulator, an acoustic optical modulator or a combination of the electro-optical modulator and the acoustic optical modulator. The pulse controller 102 is configured to convert the broadband laser into broadband pulsed light based on a received pulse control signal. For example, if the pulse control signal is at a low level, the pulse controller 102 does not output light; and if the pulse control signal is at a high level, the pulse controller 102 outputs light, so that the output of the broadband pulse signal is realized. The pulse control signal received by the pulse controller 102 can be controlled by a pulse control signal module. It is to be noted that in the embodiment, the laser signal received by the pulse controller 102 is the broadband laser, so the pulse signal output by the pulse controller 102 is referred to as the broadband pulsed light.

A first port W1 of the first wavelength division multiplexer 103 is connected to an output end of the pulse controller 102, and a second port W2 of the first wavelength division multiplexer is connected to the phase shifted fiber bragg grating unit 104. The broadband pulsed light output by the pulse controller 102 passes through the first port W1 and the second port W2 of the first wavelength division multiplexer 103. The phase shifted fiber bragg grating unit 104 includes one optical fiber, and multiple reflective phase shifted fiber bragg gratings having different central window wavelengths are arranged on one optical fiber. For example, in this embodiment, n phase shifted fiber bragg gratings are engraved in an erbium-doped fiber, the central window wavelengths are $\lambda_1$, $\lambda_2$, $\lambda_3$, $\lambda_4$, $\lambda_5$, $\lambda_6$ ... $\lambda_{n-1}$ and $\lambda_n$ respectively. The broadband pulsed light output by the pulse controller 102 passes through the first wavelength division multiplexer 103, then enters the optical fiber, passes through a PSFBG1, then is demodulated into pulsed light having the wavelength $\lambda_1$, and returns to the third port W3 through the second port W2 of the first wavelength division multiplexer 103; the light of other wavelengths passes through the optical fiber (referred to as a delay optical fiber in the embodiment) between the PSFBG1 and a PSFBG2, is transmitted to the PSFBG2, passes through the PSFBG2, then is demodulated into pulsed light having the wavelength $\lambda_2$, and returns to the third port W3 through the second port W2 of the first wavelength division multiplexer 103. Similarly, the pulsed light of other wavelengths is demodulated after passing through the rest PSFBGs, and then the pulsed light having different wavelengths arranged by a time sequence can be obtained. Moreover, the time interval between the pulsed light of all wavelengths can be set by setting the length of the delay optical fiber between the PSFBGs.

Figure 2:
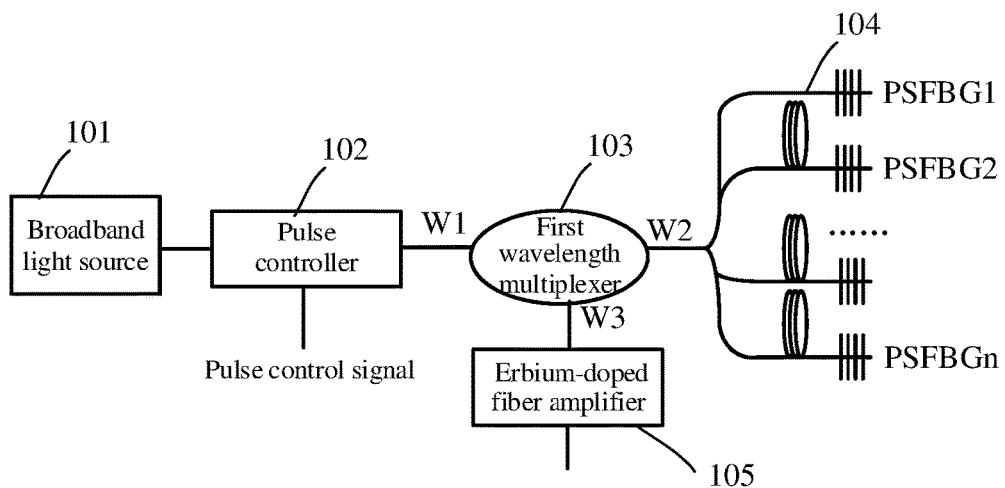
FIG. 2 is a basic structure schematic diagram of a second multi-wavelength laser provided by an embodiment of the present application.

Further, in order to amplify an optical signal output by the third port W3 of the first wavelength division multiplexer 103, as shown in FIG. 2, the embodiment also provides an erbium-doped fiber amplifier 105, wherein one end of the erbium-doped fiber amplifier 105 is connected to the third port W3 of the first wavelength division multiplexer 103 for amplifying an amplitude of the plurality of pulsed light having different wavelengths and output by the first wavelength division multiplexer 103 and then outputting the pulsed light. Certainly, optical signal amplifiers of other types may be in other embodiments, such as a ytterbium-doped fiber amplifier.

FIG. 2 is the basic structure schematic diagram of the second multi-wavelength laser provided by the embodiment of the present application. As shown in FIG. 2, the main difference between this embodiment and the above multi-wavelength laser is that the phase shifted fiber bragg grating unit 104 is composed of a plurality of optical fibers, a reflective phase shifted fiber bragg grating is etched on each optical fiber, and the central window wavelengths of the phase shifted fiber bragg gratings on the optical fibers are different. Therefore, the pulsed light having different wavelengths can be obtained after being emitted into each optical fiber through the second port W2 of the first wavelength division multiplexer 103. Moreover, laser spectra of different wavelengths arranged by time sequence can be obtained by setting the length of a delay optical fiber in each optical fiber.

Figure 3:
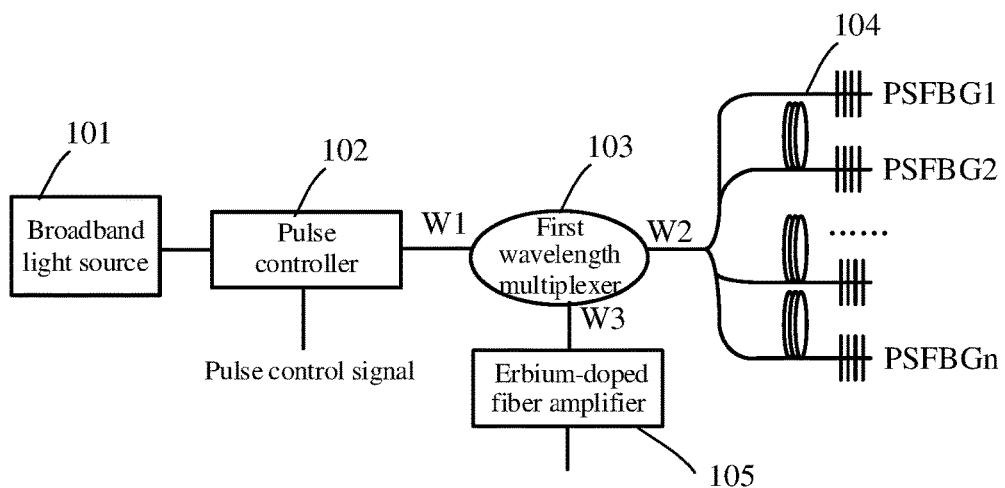
FIG. 3 is a basic structure schematic diagram of a third multi-wavelength laser provided by an embodiment of the present application.

FIG. 3 is the basic structure schematic diagram of the third multi-wavelength laser provided by the embodiment of the present application. As shown in FIG. 3, the main difference between this embodiment and the second multi-wavelength laser is that the phase shifted fiber bragg grating on the optical fiber is a transmissive phase-shifting optical fiber; and further, in this embodiment, the second port W2 of the first wavelength division multiplexer 103 is connected to one end of the phase shifted fiber bragg grating unit 104, and the other end of the phase shifted fiber bragg grating unit 104 is connected to an input port of the erbium-doped fiber amplifier 105.

Figure 4:
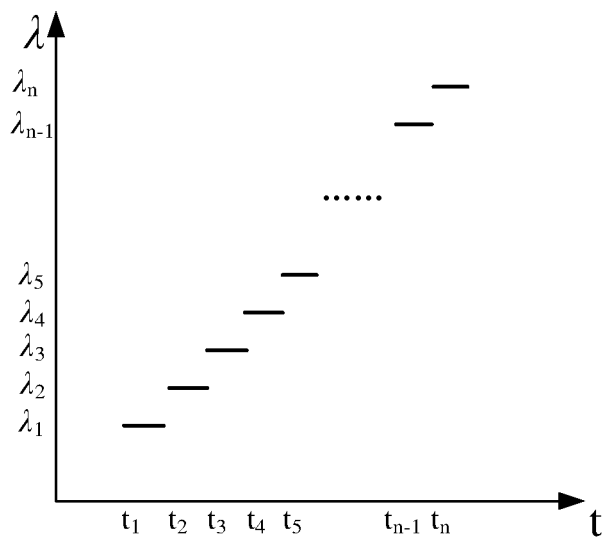
FIG. 4 is a schematic diagram of laser spectrums output by a multi-wavelength laser and arranged by a time sequence according to an embodiment of the present application.

FIG. 4 is the schematic diagram of laser spectrums output by the multi-wavelength laser and arranged by the time sequence according to the embodiment of the present application. As shown in FIG. 4, optical pulses output by the multi-wavelength laser 10 output wavelength sequences $\lambda$ ($\lambda 1$, $\lambda 2$ ... $\lambda n-1$, $\lambda n$) in time sequences T (t1, t2 ... tn-1 and tn), and the following conditions are met:

$$t_n - t_{n-1} = L_n / v_g (n \geq 2) \quad (1)$$

$$t_n - t_1 = W \quad (2)$$

wherein Ln represents the length of the $n^{th}$ delay optical fiber, W represents the pulse width of the pulse control signal, and $v_g$ represents the transmission speed of light in an optical fiber medium.

It is to be noted that in other embodiments, the internal structure of the multi-wavelength laser 10 can also be a combined structure of any two or three implementation modes.

Figure 5:
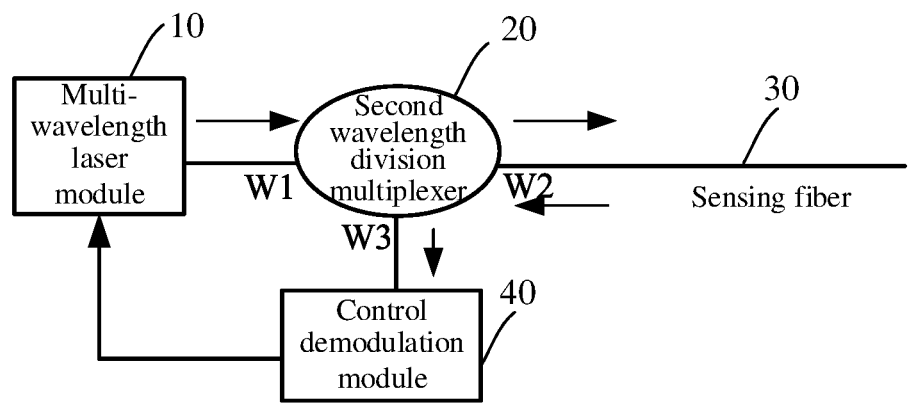
FIG. 5 is basic structure schematic diagram of a continuous spatial synchronization monitoring device for an ocean temperature and pressure provided by an embodiment of the present application.

Based on the multi-wavelength laser, the embodiment further provides a continuous space monitoring device for an ocean temperature and pressure. FIG. 5 is the basic structure schematic diagram of the continuous space monitoring device for the ocean temperature and pressure provided by the embodiment of the present application. As shown in FIG. 5, the device includes a multi-wavelength laser 10, a second wavelength division multiplexer 20, a sensing fiber 30 and a control demodulation module 40. The pulse control signal received by the pulse controller in the multi-wavelength laser 10 can be output by the control demodulation module 40. Certainly, a pulse control signal output module can be additionally arranged.

The pulsed light of various wavelengths output by the multi-wavelength laser 10 enters the sensing fiber 30 through the second wavelength division multiplexer 20. The sensing fiber 30 is arranged in seawater, and the sensing fiber 30 can be vertically and directly communicated to the seabed. The sensing fiber 30 is vertically connected to a deep water anchoring and mooring device on the seabed. The deep water anchoring and mooring device can use an anchor for mooring a ship, and the anchor is directly connected to a lower end of the sensing fiber 30.

The sensing fiber 30 is vertically communicated to the seabed through the deep water anchoring and mooring device, so the temperature distribution and pressure of each point on the sensing fiber 30 are the temperature field and pressure distribution of the ocean vertically distributed along the depth. The sensing fiber 30 has strong seawater corrosion resistance, seawater side pressure resistance under the sea surface of tens of thousands of meters and tensile resistance.

Further, the coherence length of pulsed light output by the multi-wavelength laser 10 adopted by the embodiment is low. In order to realize interference adjustment demodulation, the embodiment abandons a traditional method of interference of backward Rayleigh scattering light and laser local oscillation light, and adopts a backward Rayleigh scattering light self-interference method to realize signal demodulation.

Two circumstances of non-uniform optical fiber density caused by thermal disturbance and impure optical fiber concentration (such as oxide having non-uniform concentration) are main reasons of non-uniform optical fiber refractive index. The size of a non-uniform structure in the optical fiber is generally smaller than the wavelength of incident light, so the incident light may generate a Rayleigh scattering phenomenon when being transmitted in the sensing fiber 30.

The power of pulsed light emitted into the optical fiber is set as $P_0$, and the expression of backward Rayleigh scattering light power $P_{BS}(L)$ at a position L away from an initial end of the sensing fiber 30 is shown as follows:

$$P_{BS}(L) = \tfrac{1}{2} \upsilon_g \tau C_R \alpha_s P_0 e^{-2\alpha L} \tag{3}$$

In the Formula (3), $\upsilon_g$ represents the transmission speed of light in the optical fiber medium; $\tau$ represents the width of the pulsed light incident into the optical fiber; $C_R$ represents the backward Rayleigh scattering coefficient, namely the ratio of the backward Rayleigh scattering power to the total Rayleigh scattering power; $\alpha_s$ represents a Rayleigh attenuation coefficient; $\alpha$ represents an optical fiber attenuation coefficient; and L represents a distance from the initial end of the optical fiber to a scattering point.

The Formula (3) represents the scattering power at different positions on the sensing fiber 30, and the distributed measurement of the whole optical fiber can be realized by monitoring the light power, namely continuous space measurement of parameters can be realized.

If the temperature on the sensing fiber is not changed, backward Rayleigh scattering curves measured at different moments are the same; and if the temperature on the sensing fiber is changed, the backward Rayleigh scattering curves before the temperature change can be restored by searching the incident light frequency.

It is assumed that the temperature of the sensing fiber 30 at the initial moment a is 25° C., the backward Rayleigh scattering light power Pa (v, z) on the sensing fiber can be obtained through the incident frequency v of the multi-wavelength laser 10. The backward Rayleigh scattering light power Pb (v, z) can be measured at the moment b by the same method. If the temperature of the sensing fiber at the moment a and the moment b is not changed, the Pb (v, z) is the same as the Pa (v, z); and if the temperature or strain is changed, and the incident frequency is searched to reach v+Δv, Pb (v+Δv, z) is the same as Pa (v, z). Δv represents a frequency variation of the incident frequency and is related to the temperature change on the sensing fiber, which means that the temperature or strain change on the sensing fiber causes the shift of the backward Rayleigh scattering light power Pb (v, z) on a frequency domain.

In summary, the backward Rayleigh scattering light power Pa (v, z) and Pb (v, z) generated at the moment a and the moment b are subjected to correlation processing, and correlation function reaching the maximum value corresponds to the variation of the frequency of corresponding incident light. Therefore, the distribution information of the temperature on the sensing fiber 30 can be obtained by calculating the peak frequency of the frequency spectrum of the correlation function. That is, the control demodulation module 40 can obtain the distribution information of the temperature on the sensing fiber 30 according to the backward Rayleigh scattering light power change of the pulsed light of each wavelength caused by the temperature change at each point on the sensing fiber 30, and then a temperature field of ocean distributed along the depth can be obtained.

Meanwhile, the backward Rayleigh scattering light wavelength sequence enters the control demodulation module 40, and the phase of a fixed wavelength in backward Rayleigh scattering light can be demodulated, so that the dynamic pressure of seawater can be analyzed. According to different forms of control demodulation modules, a Phase Generated Carrier (PGC) or 3×3 coupler phase demodulation solution is adopted in the embodiment for demodulating the self-interference phase of the backward Rayleigh scattering light.

Figure 6:
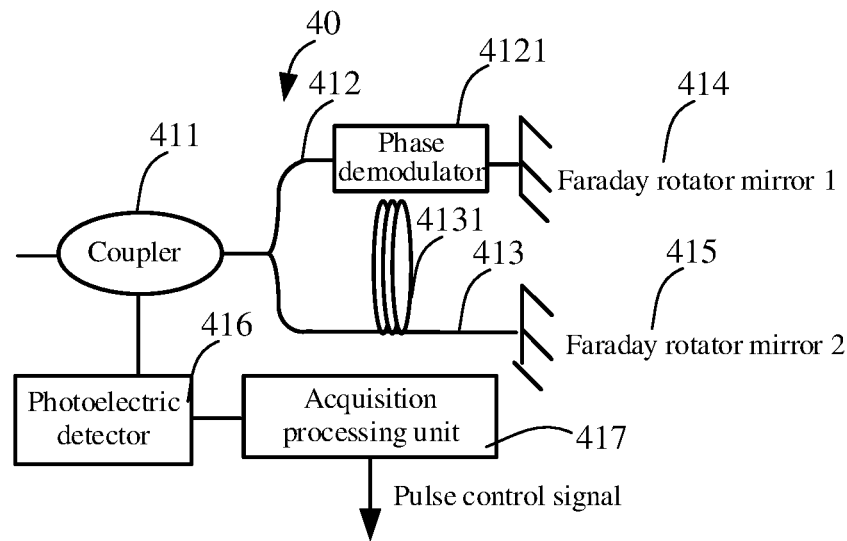
FIG. 6 is a basic structure schematic diagram of a first control demodulation module provided by an embodiment of the present application.

FIG. 6 is the basic structure schematic diagram of the first control demodulation module provided by the embodiment of the present application. As shown in FIG. 6, the embodiment adopts a PGC demodulation mode based on a Michelson interferometer. This module mainly includes a coupler 411, a first interference arm 412, a second interference arm 413, Faraday rotator mirrors 414, 415, photoelectric detectors 416 and an acquisition processing unit 417, wherein a first end of the coupler 411 is connected to the second port of the second wavelength division multiplexer 20, a second end of the coupler 411 is connected to one end of the first interference arm 412 and one end of the second interference arm 413, and the other end of the first interference arm 412 and the other end of the second interference arm 413 are connected to the Faraday rotator mirrors 414, 415 respectively. In addition, a phase modulator 4121 is arranged on the first interference arm 412; a phase matching ring 4131 is arranged on the second interference arm 413, and the length L of the phase matching ring 4131 meets the condition L≤Lo/2, wherein $L_o$ represents the coherence length of pulsed light. Certainly, the phase matching ring 4131 can also be arranged on the first interference arm 412.

The photoelectric detectors 416 are connected to a third end of the coupler 411 for receiving the backward Rayleigh scattering interference light returned by the first interference arm 412 and the second interference arm 413 and generating corresponding electric signals according to the backward Rayleigh scattering interference light. The acquisition processing unit 417 is connected to the photoelectric detectors 416 for processing the electric signals output by the photoelectric detector 416 and demodulating phase change of the pulsed light of one wavelength caused by a disturbance signal in the sensing fiber so as to monitor the seawater pressure. In addition, the seawater temperature can be monitored according to the power change of the backward Rayleigh scattering light of the pulsed light of each wavelength caused by temperature change.

Specifically, for phase demodulation, according to the light coherence principle, the light intensity I on the photoelectric detectors 416 can be expressed as follows:

$$I = A + B \cos \Phi(t) \tag{4}$$

In the Formula (4), A represents an average light power output by the interferometer; B represents an interference signal amplitude, B=κA, and κ≤1 and κ represents an interference fringe visibility; and Φ(t) represents a phase difference of the interferometer. If Φ(t)=C cos ω₀t+φ(t), the Formula (2) can be written as follows:

$$I = A + B \cos[C \cos \omega_0 t + \varphi(t)] \tag{5}$$

In the Formula (5), C cos ω₀t represents a phase generated carrier; C represents the amplitude, and wo represents carrier frequency; φ(t)=D cos ω_s t+Ψ(t), D cos ω_s t represents the phase change caused by the disturbance signal of the sensing fiber 30; D represents the amplitude; $\omega_s$ represents a sound field signal frequency; and Ψ(t) represents the slow change of the initial phase caused by environmental disturbance and the like. The Formula (5) is obtained by expanding a Bessel function:

$$I = A + B \left\{ \left[ J_0(C) + 2\sum_{k=0}^{\infty}(-1)^k J_{2k}(C)\cos 2k\omega_0 t \right] \cos\phi(t) - \tag{6}$$

$$2\left[\sum_{k=0}^{\infty}(-1)^k J_{2k+1}(C)\cos(2k+1)\omega_0 t\right]\sin\phi(t)\Bigg\}$$

In the Formula (6), $J_n(m)$ represents a n-order Bessel function value under an m modulation depth. Setting that k=0 and k=1 respectively, a highest-quality signal and a frequency-doubled signal can be obtained.

After the Bessel function expansion, a multiplication of a fundamental frequency signal (the amplitude is G) and a frequency doubling signal (the amplitude is H) is carried out for the detector signal output by the interferometer. In order to overcome blanking and distortion phenomena of the signals along with fluctuation of an external interference signal, Differential Cross Multiplication (DCM) is carried out on the two paths of signals; and the signals after the differential cross multiplication are subjected to differential amplification and integral operation processing to be converted as follows:

$$B^2 GHJ_1(C)J_2(C)\dot{\varphi}(t) \tag{7}$$

$\varphi(t)=D\cos\omega_s t+\Psi(t)$ is substituted into the Formula (5) to obtain:

$$B^2 GHJ_1(C)J_2(C)[D\cos\omega_s t+\Psi(t)] \tag{8}$$

Therefore, the signals obtained after integration comprise a to-be-detected signal $D\cos\omega_s t$ and external environment information. The latter is usually a slow-change signal, and its amplitude may be very large. The slow-change signal can be filtered through a high-pass filter, and finally the output is shown as follows:

$$B^2 GHJ_1(C)J_2(C)D\cos\omega_s t \tag{9}$$

The $D\cos\omega_s t$ signal of phase change caused by the disturbance signal of the sensing fiber 30 can be solved through the Formula (9).

Figure 7:
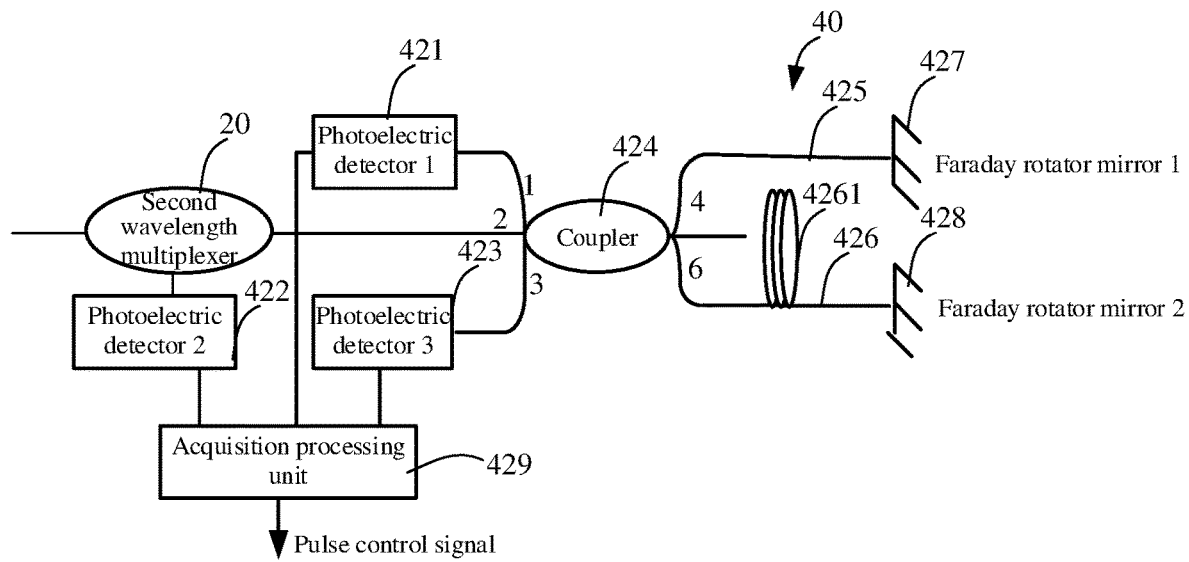
FIG. 7 is a basic structure schematic diagram of a second control demodulation module provided by an embodiment of the present application.

FIG. 7 is the basic structure schematic diagram of the second control demodulation module provided by the embodiment of the present application. As shown in FIG. 7, the embodiment adopts a 3×3 coupler phase demodulation mode based on the Michelson interferometer. This module mainly includes a coupler 424, a first interference arm 425, a second interference arm 426, Faraday rotator mirrors 427, 428, a first photoelectric detector 421, a second photoelectric detector 422, a third photoelectric detector 423, a second wavelength division multiplexer and an acquisition processing unit 429.

The first end of the coupler 424 is connected to a third port of the second wavelength division multiplexer 20, the second end of the coupler 424 is connected to one end of the first interference arm 425 and one end of the second interference arm 426, and the other end of the first interference arm 425 and the other end of the second interference arm 426 are respectively connected to the Faraday rotator mirrors 427, 428. In addition, a phase matching ring 4261 is arranged on the second interference arm 426, and the length L of the phase matching ring 4261 meets the condition L≤Lo/2, wherein $L_o$ represents the coherence length of pulsed light. Certainly, the phase matching ring 4261 can also be arranged on the first interference arm 425.

The first photoelectric detector 421, the second photoelectric detector 422 and the third photoelectric detector 423 are all connected to the coupler 424 for receiving the backward Rayleigh scattering interference light returned by the first interference arm 425 and the second interference arm 426 and generating corresponding electric signals according to the backward Rayleigh scattering interference light.

The backward Rayleigh scattering light is incident to a port 2 of the coupler 424 through a circulator 20 and is split into two paths of light signals through the port 2 of the coupler 424. One path of light enters a port 4 of the coupler 424, and returns to the port 4 of the coupler 424 through the first interference arm 425 and the Faraday rotator mirror 427. The other path of light enters a port 6 of the coupler 424, and returns to the port 6 of the coupler 424 through the second interference arm 426 and the Faraday rotator mirror 428. The two paths of light are subjected to beam combination interference at the coupler 424. Backward Rayleigh scattering interference light enters the first photoelectric detector 421 and the third photoelectric detector 423 through the port 1 and the port 3 of the coupler 424; and the backward Rayleigh scattering interference light enters the second photoelectric detector 422 through the port 2 of the coupler 424 and the first wavelength division multiplexer 20.

The light intensity expression obtained by three detectors is as follows:

$$I_p=D+I_0\cos[\phi(t)-(p-1)\times(2\pi/3)], p=1,2,3 \tag{10}$$

In the Formula (10), $\Phi(t)=\phi(t)+\psi(t)$; D represents an interference signal direct current component; $I_0$ represents an interference signal alternating current component amplitude; p represents a serial number of light signals received by the detectors, and p=1, 2, 3; $\phi(t)$ represents a phase difference signal caused by the disturbance signals, in the unit of rad; and $\psi(t)$ represents a phase difference signal caused by environmental noise, in the unit of rad.

Then, phase demodulation on the light signals received by the three detectors is carried out by the acquisition processing unit 429 so as to obtain the phase change, caused by the disturbance signal in the sensing fiber 30, of the pulsed light of one wavelength. In addition, the acquisition processing unit 429 is also configured to obtain the power change of the backward Rayleigh scattering light, caused by temperature change, of the pulsed light of each wavelength.

Figure 8:
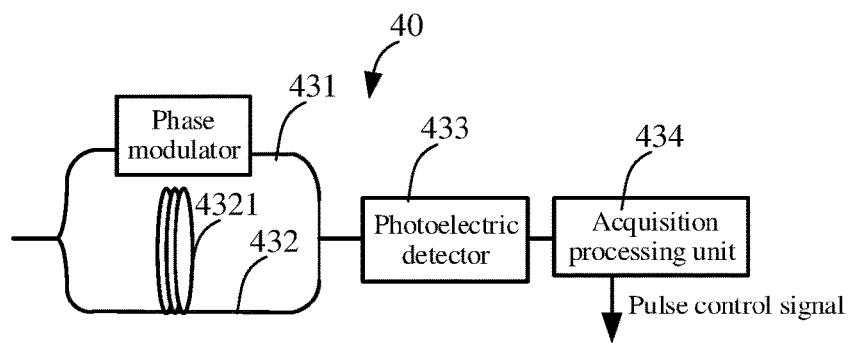
FIG. 8 is a basic structure schematic diagram of a third control demodulation module provided by an embodiment of the present application.

FIG. 8 is the basic structure schematic diagram of the third control demodulation module provided by the embodiment of the present application. As shown in FIG. 8, the embodiment adopts a PGC phase demodulation mode based on a Mach-Zehnder interferometer. This module mainly includes a first interference arm 431, a second interference arm 432, photoelectric detectors 433 and an acquisition processing unit 434.

The third port of the second wavelength division multiplexer 20 is connected to one end of the first interference arm 431 and one end of the second interference arm 432 respectively, and the other end of the first interference arm 431 and the other end of the second interference arm 432 are connected to the photoelectric detectors 433 respectively. In addition, the phase matching ring 4321 is arranged on the second interference arm 432, and the length L of the phase matching ring 4321 meets the condition L≤$L_o$, wherein $L_o$ represents the coherence length of pulsed light. Certainly, the phase matching ring 4321 can also be arranged on the first interference arm 431.

The photoelectric detector 433 is configured to receive the backward Rayleigh scattering interference light output by the first interference arm 431 and the second interference arm 432 and generate a corresponding electric signal according to the backward Rayleigh scattering interference light. The acquisition processing unit 434 is connected to the photoelectric detectors 433 for processing the electric signal output by the photoelectric detectors and demodulating phase change, caused by the disturbance signal in the sensing fiber, of the pulsed light of one wavelength, and the power change of the backward Rayleigh scattering light, caused by the temperature change, of the pulsed light of each wavelength.

Each embodiment in this specification is described in a progressive manner. The same and similar parts between each embodiment can be seen from each other. Each embodiment focuses on the differences from other embodiments.

Those skilled in the art will easily think of other embodiments of the present application after considering the specification and practicing the present application herein. The present application is intended to cover any variant, use or adaptive change of the present application, which follows the general principles of the present application and includes the common general knowledge or conventional technical means in the technical field that are not invented by the present application. The description and embodiments are only regarded as illustrative. The true scope and spirit of the present application are indicated by the following claims.

It should be understood that the present application is not limited to the precise structure described above and shown in the drawings, and various modifications and changes can be made without departing from its scope. The scope of the present application is limited only by the appended claims.

What is claimed is:

1. A multi-wavelength laser for synchronously monitoring temperature and pressure of an ocean, comprising a broadband laser source, a pulse controller and a phase shifted fiber bragg grating unit, wherein the broadband laser source is configured to output broadband laser;

the pulse controller is configured to convert the broadband laser output by the broadband laser source into broadband pulsed light; and the phase shifted fiber bragg grating unit is configured to demodulate a plurality of pulsed light arranged by a time sequence and having different wavelengths from the broadband pulsed light, wherein the laser further comprises a first wavelength division multiplexer, wherein a first port of the first wavelength division multiplexer is connected to an output end of the pulse controller, a second port of the first wavelength division multiplexer is connected to the phase shifted fiber bragg grating unit, and a third port of the first wavelength division multiplexer is configured to output the plurality of pulsed light arranged by the time sequence and having different wavelengths; and wherein the phase shifted fiber bragg grating unit comprises one optical fiber, and multiple reflective phase shifted fiber bragg gratings having different central window wavelengths are arranged on the optical fiber.

2. The multi-wavelength laser for synchronously monitoring temperature and pressure of the ocean according to claim 1, wherein the phase shifted fiber bragg grating unit comprises a plurality of optical fibers; a reflective phase shifted fiber bragg grating is arranged on each optical fiber;

and the central window wavelengths of the phase shifted fiber bragg gratings on all the optical fibers are different.

3. The multi-wavelength laser for synchronously monitoring temperature and pressure of the ocean according to claim 1, wherein the laser further comprises a first wavelength division multiplexer; the phase shifted fiber bragg grating unit comprises a plurality of optical fibers; a transmissive phase shifted fiber bragg grating is arranged on each optical fiber; and the central window wavelengths of the phase shifted fiber bragg gratings on all the optical fibers are different;

the first port of the first wavelength division multiplexer is connected to an output end of the pulse controller, and the second port of the first wavelength division multiplexer is connected to one end of each optical fiber.

4. The multi-wavelength laser for synchronously monitoring temperature and pressure of the ocean according to claim 1, wherein the laser further comprises a signal amplifier, wherein the signal amplifier is configured to amplify an amplitude of the plurality of pulsed light having different wavelengths and then output the pulsed light.

5. The multi-wavelength laser for synchronously monitoring temperature and pressure of the ocean according to claim 4, wherein the signal amplifier is an erbium-doped fiber amplifier or an ytterbium-doped fiber amplifier.

6. The multi-wavelength laser for synchronously monitoring temperature and pressure of the ocean according to claim 1, wherein the pulse controller is an electro-optical modulator and/or an acoustic optical modulator.

* * * * *